US008200382B2

(12) United States Patent
Hahn

(10) Patent No.: US 8,200,382 B2
(45) Date of Patent: Jun. 12, 2012

(54) METHOD AND SYSTEM FOR TORQUE CONTROL OF A HYBRID AUTOMOBILE AFTER A START

(75) Inventor: Hermann Hahn, Hannover (DE)

(73) Assignee: VOLKSWAGEN Aktiengesellschaft, Wolfsburg (DE)

( * ) Notice: Subject to any disclaimer, the term of this patent is extended or adjusted under 35 U.S.C. 154(b) by 722 days.

(21) Appl. No.: 11/933,707

(22) Filed: Nov. 1, 2007

(65) Prior Publication Data

US 2008/0109125 A1 May 8, 2008

(30) Foreign Application Priority Data

Nov. 3, 2006 (DE) .................. 10 2006 051 832

(51) Int. Cl.
*B60L 9/00* (2006.01)
(52) U.S. Cl. .................. 701/22; 180/65.21; 903/945
(58) Field of Classification Search .................. 701/22, 701/113; 123/406.53; 180/65.25; 60/284
See application file for complete search history.

(56) References Cited

U.S. PATENT DOCUMENTS

| | | | |
|---|---|---|---|
| 6,367,570 B1 * | 4/2002 | Long et al. .................. 180/65.26 |
| 6,856,034 B2 * | 2/2005 | Peters et al. .................. 290/40 C |
| 6,931,839 B2 * | 8/2005 | Foster .................. 60/284 |
| 7,007,460 B2 * | 3/2006 | Frieden et al. .................. 60/284 |
| 7,013,213 B2 * | 3/2006 | McGee et al. .................. 701/113 |
| 7,395,659 B2 * | 7/2008 | Pott .................. 60/285 |
| 7,426,910 B2 * | 9/2008 | Elwart .................. 123/46 E |
| 2003/0196631 A1 * | 10/2003 | Dehrmann et al. .................. 123/192.1 |
| 2004/0098970 A1 * | 5/2004 | Foster .................. 60/284 |
| 2004/0104058 A1 * | 6/2004 | Peters et al. .................. 180/65.2 |
| 2006/0156710 A1 * | 7/2006 | Pott .................. 60/285 |
| 2006/0168958 A1 * | 8/2006 | Vetrovec .................. 60/599 |
| 2007/0021267 A1 * | 1/2007 | Obayashi et al. .................. 477/107 |
| 2007/0240921 A1 * | 10/2007 | Katzenberger et al. .................. 180/65.2 |
| 2008/0098972 A1 * | 5/2008 | Elwart .................. 123/142.5 E |
| 2008/0224478 A1 * | 9/2008 | Tamor .................. 290/40 C |

FOREIGN PATENT DOCUMENTS

| DE | 10333210 A1 | 1/2005 |
|---|---|---|
| DE | 102005003628 A1 | 8/2006 |

OTHER PUBLICATIONS

English Language Abstract for DE 10333210.
English Language Abstract for DE 102005003628.

* cited by examiner

*Primary Examiner* — Helal A Algahaim
(74) *Attorney, Agent, or Firm* — Norris, McLaughlin & Marcus, P.A.

(57) ABSTRACT

The invention is directed to a method and a system for controlling a drive torque of a hybrid drive unit (10) of an automobile after a start. The hybrid drive unit (10) includes a first drive source (12), in particular an internal combustion engine, includes at least one electric machine (14), which can be operated either in motor-mode or in generator-mode, wherein the electric machine (14) provides in motor operation an electromotive torque (M_EM), which in conjunction with a torque (M_VM) of the first drive source (12) represents a total drive torque of the drive unit (10), and supplies in generator-mode electric power.

15 Claims, 2 Drawing Sheets

METHOD AND SYSTEM FOR TORQUE CONTROL OF A HYBRID AUTOMOBILE AFTER A START

Figure 1:
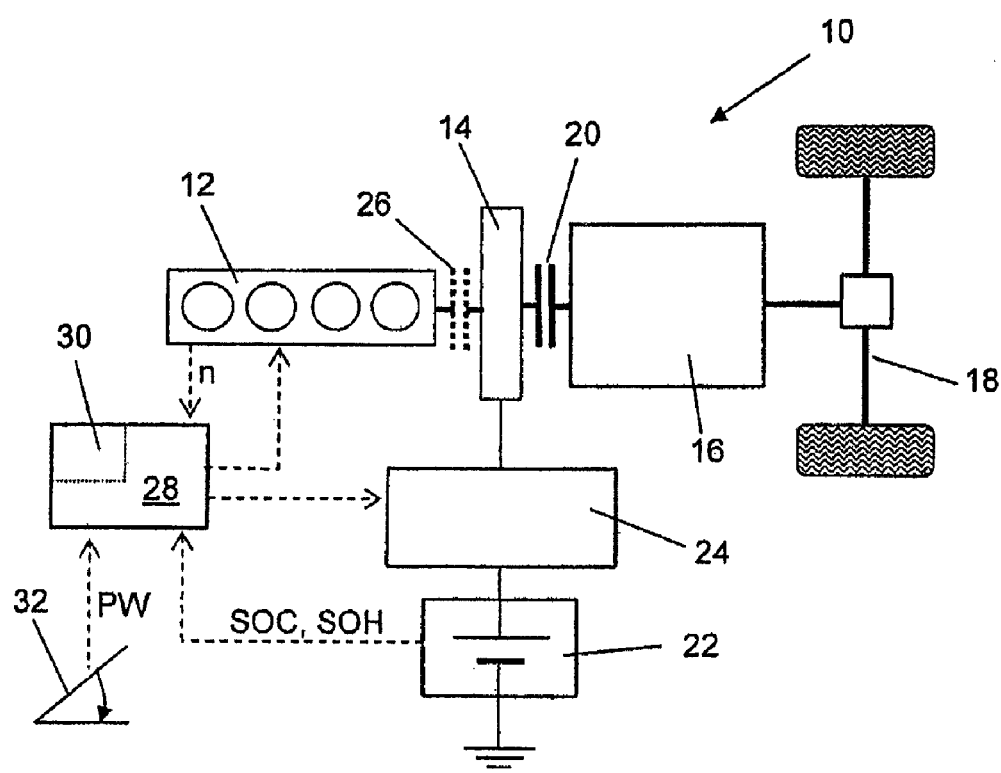

The invention is directed to a method for controlling a drive torque of a hybrid drive unit of an automobile after a start, in particular an engine cold start. The hybrid drive unit includes a first drive source, in particular an internal combustion engine, and in addition at least one electric machine, which can be operated either in motor-mode or in generator-mode. The electric machine provides in motor-mode an electromotive torque, which in conjunction with a torque of the first drive source represents a total drive torque of the drive unit, and which in generator-mode supplies electric power. The invention is also directed to a hybrid vehicle with a corresponding torque control.

The term hybrid vehicle designates automobiles having at least two drive units which are combined with each other and are based on different energy sources for providing the power for driving the vehicle. Advantageously, the characteristics of an internal combustion engine which produces kinetic energy by combustion of gasoline or diesel fuel, and an electric machine which converts electric energy into motion energy. Modern hybrid vehicles are therefore predominantly equipped with a combination of an internal combustion engine and one or more electric machines. A distinction can be made between two different hybrid concepts. In the so-called serial hybrid concepts, the vehicle is driven exclusively by the electric machine, whereas the internal combustion engine produces with a separate generator the electric current for charging an energy store which powers the E-machine or powers the E-machine directly. However, applications at least in passenger vehicles currently prefer parallel hybrid concepts, wherein the vehicle drive can be represented by the internal combustion engine as well as by the E-machine. The present invention relates to parallel hybrid concepts.

The electric machines employed in these parallel concepts can be operated as a motor-mode or as a generator. For example, the E-machine operating in motor-mode is typically switched in at greater vehicle loads, in support of the internal combustion engine. The E-machine can also operate as a starter motor for the internal combustion engine. Conversely, when operating with the internal combustion motor, the E-machine is mainly operated as a generator, whereby the generated electric power of the E-machine is used, for example, to charge the energy store and/or to supply the onboard vehicle electric system. In a power-split hybrid concept with more than one E-machine, the generator operation of an E-machine can also be used to power another E-machine. Moreover, at least a portion of the braking power is provided by the E-machine operating in generator-mode (recuperation), wherein a portion of the dissipated mechanical energy is converted into electric energy. Advantageously, the E-machines used in hybrid concepts have a better efficiency than conventional claw-pole generators.

Conventional vehicles powered only by an internal combustion engine, as well as hybrid vehicles, can exhibit a problem when an exhaust gas emission control system has not yet attained its operational readiness after a motor start, in particular a cold start. For example, catalytic converters have not yet reached their "turn-on temperature", the so-called light-off temperature, so that adequate conversion of harmful exhaust gas components cannot be ensured during this phase. Moreover, gas sensors in the exhaust gas system, in particular lambda sensors, require a minimum operating temperature before being able to control the internal combustion engine and the catalytic converters. Certain operating parameters of the internal combustion engine, such as injection quantities and timing, cylinder fill, ignition angles, etc., are typically optimized in such a way that, on one hand, the exhaust gas emission control system quickly reaches its operational readiness and, on the other hand, the raw emissions of certain exhaust gas components produced by the internal combustion engine are reduced to a minimum. These are typically based on the regulatory emission test cycles having defined load requirements during and after a vehicle start. However, disadvantageously, the actual load requested by an individual driver frequently deviates from the theoretical loads of predetermined speed profiles. This affects in particular start processes in normal road traffic. Not only the profiles from different drivers differ from one another, but also the individual load requirements from the same driver during different starts. These non-reproducible driver effects cause during each engine start different, non-reproducible quantities of raw emissions and final emissions. In extreme cases, the regulatory exhaust gas limits may be met by one driver and not by another driver, even when using identical systems.

It is therefore an object of the present invention to provide a controller for the drive torque of a hybrid vehicle which reduces or may even eliminate driver-specific and start process-specific effects on the exhaust gas emission during or after a vehicle or engine are started. It is another of object to provide a suitable torque control device for carrying out the method.

The object is attained with a method and a torque control having the features of the independent claims. According to the method of the invention, after a start, a torque difference is determined between a predetermined nominal torque and an actual requested desired torque, and if predetermined criteria are met, the first drive source of the hybrid drive, which in particular is an internal combustion engine, is operated (independent of the actual load demand from the driver) according to the predetermined nominal torque. The method also provides that the electric machine is operated in motor-mode when the difference is negative, i.e., when the requested desired torque is greater than the predetermined nominal torque, so as to provide an electromotive torque corresponding substantially to the torque difference. The sum of the electromotive torque and the torque of the first drive source (in particular the internal combustion engine) forms a total drive torque of the hybrid drive unit which corresponds to the requested desired torque. As customary, the predetermined nominal torque is defined as a function of the actual rotation speed from stored curves or curve fields. If the driver requests at the actual rotation speed a greater torque than the predetermined torque, then instead of increasing the torque of the first drive source (internal combustion engine), the difference between the predefined nominal torque and the requested torque is provided by the electric drive component of the hybrid drive. With the method of the invention, a first device source can be operated during the individual start processes with parameters which are optimized for low raw emissions and a quick turn-on of the emission control system and designed for the characteristic curve of the predetermined nominal torque, independent of the effects specific to a driver and the start process. The operation of the first drive source (internal combustion engine) and hence the entire system can thereby be reproducibly optimized during the start process with respect to low overall exhaust gas emissions.

According to another advantageous embodiment of the invention, for a positive torque difference, i.e., if the requested desired torque is smaller than the predetermined nominal torque, the electric machine is operated in generator-mode to supply electric energy essentially corresponding to the difference, wherein again the first drive source is operating according to the predetermined nominal torque. In other words, when the driver requests at an actual rotation speed a lower torque than the nominal torque, then the torque of the first drive source (internal combustion engine) is not decreased accordingly, but the excess difference between the predetermined nominal torque and the requested torque is instead supplied to the electric drive component which then produces electric energy in generator-mode. The produced electric energy can be used for charging an energy store, for example the vehicle battery or an additional energy store, and/or for directly powering a vehicle electric system.

The nominal torque predetermined as a function of the actual rotation speed can be constant or expressed by a time-dependent (dynamic) curve. Preferably, the predetermined nominal torque is predefined as a function of an actual rotation speed of the first drive source in accordance with a standardized driving cycle, in particular according to a (regulatory) standardized exhaust gas driving cycle. In addition, the nominal torque can optionally be predetermined as a function of the elapsed time after the start.

The predetermined criteria which need to be met for applying the method of the invention are intended to ensure that the method is limited to the start process, i.e., only when the exhaust gas emission control system is not operating. The criteria shall also ensure that the method is only performed under realistic conditions.

To satisfy the first requirement, the predetermined criteria include criteria for determining an inactivity of an exhaust gas emission control system of the vehicle. For example, it may be required that the actual catalytic converter temperature falls below a predetermined limit temperature, in particular the light-off temperature. The actual catalytic converter temperature can either be measured using temperature sensors, computed using suitable models or derived from curve fields. Likewise, an integrated heat supplied to the exhaust gas system after an engine start can be determined which must then be less than a predetermined limit value. Another criterion might be that the catalytic converter light-off, i.e., the turn on of the catalytic activity of the catalytic converter, is not yet recognized. This can be accomplished by using suitable, temperature-independent evaluation methods which may make use of the concentration of exhaust gas components measured downstream of the catalytic converter. The required inactivity of the exhaust gas emission control system can also be determined indirectly by determining that a predetermined time interval has not yet elapsed after the start of the internal combustion engine, i.e., after the driver turns the ignition key or activates an ignition switch and the like, and/or after the start of the first drive source. Another criterion relates to the requirement that the operational readiness of exhaust gas sensors of the emission control system, in particular lambda sensors, has not yet been reached. All these criteria may be applied individually or in combination.

To satisfy the second requirement, the predetermined criteria include criteria for determining feasibility of the torque control method. Suitable criteria may include, for example, that the rotation speed requested for driving the vehicle is within a predetermined rotation speed range and/or that the desired torque requested for driving the vehicle is within a predetermined torque range. Moreover, a charge state (SOC for "state of charge") of the energy store powering the electric machine may be required to exceed a predetermined value, so as to ensure that the desired electromotive torque can be provided without impermissibly draining the energy store. An adapted actual vehicle height above normal Null (NN) may also be required to be less than a predetermined value. These criteria which are relevant for carrying out the method can be used individually or in combination, and can also be combined with the aforedescribed exhaust gas-relevant criteria.

According to another preferred embodiment of the invention, a tolerance range is set for the predetermined nominal torque and the torque difference between the predetermined nominal torque with the added tolerance range and the actual requested desired torque is determined. For example, the tolerance range may be ±15%, in particular ±10%, of the nominal torque. According to this embodiment, the method of the invention is only applied, for example, when the requested desired torque deviates by 15% or 10% upward or downward from the nominal torque. This approach can eliminate frequent jumps between the process of the invention and the conventional "normal operating mode".

According to yet another advantageous embodiment of the invention, the method according to the invention is suspended when the absolute value of the determined torque difference exceeds a maximal predetermined difference. This ensures that technical limits of the system are not exceeded, for example that the torque requested by the electric machine can indeed be supplied, when taking the charge state of the energy store into account.

Another aspect of the invention is directed to a torque controller for an automobile with a hybrid drive unit, which includes a first drive source, in particular an internal combustion engine, and at least one electric machine, which can be operated either in motor-mode or in generator-mode, wherein the electric machine provides in motor-mode an electromotive torque, which in conjunction with a torque of the first drive source corresponds to a total drive torque of the drive unit, and supplies electric power when operating in generator-mode. The torque controller includes a (digital) program algorithm which carries out the aforedescribed steps of the method of the invention. The program algorithm is preferably stored in a motor controller.

Advantageous embodiments of the invention are recited in the remaining dependent claims.

Figure 2:
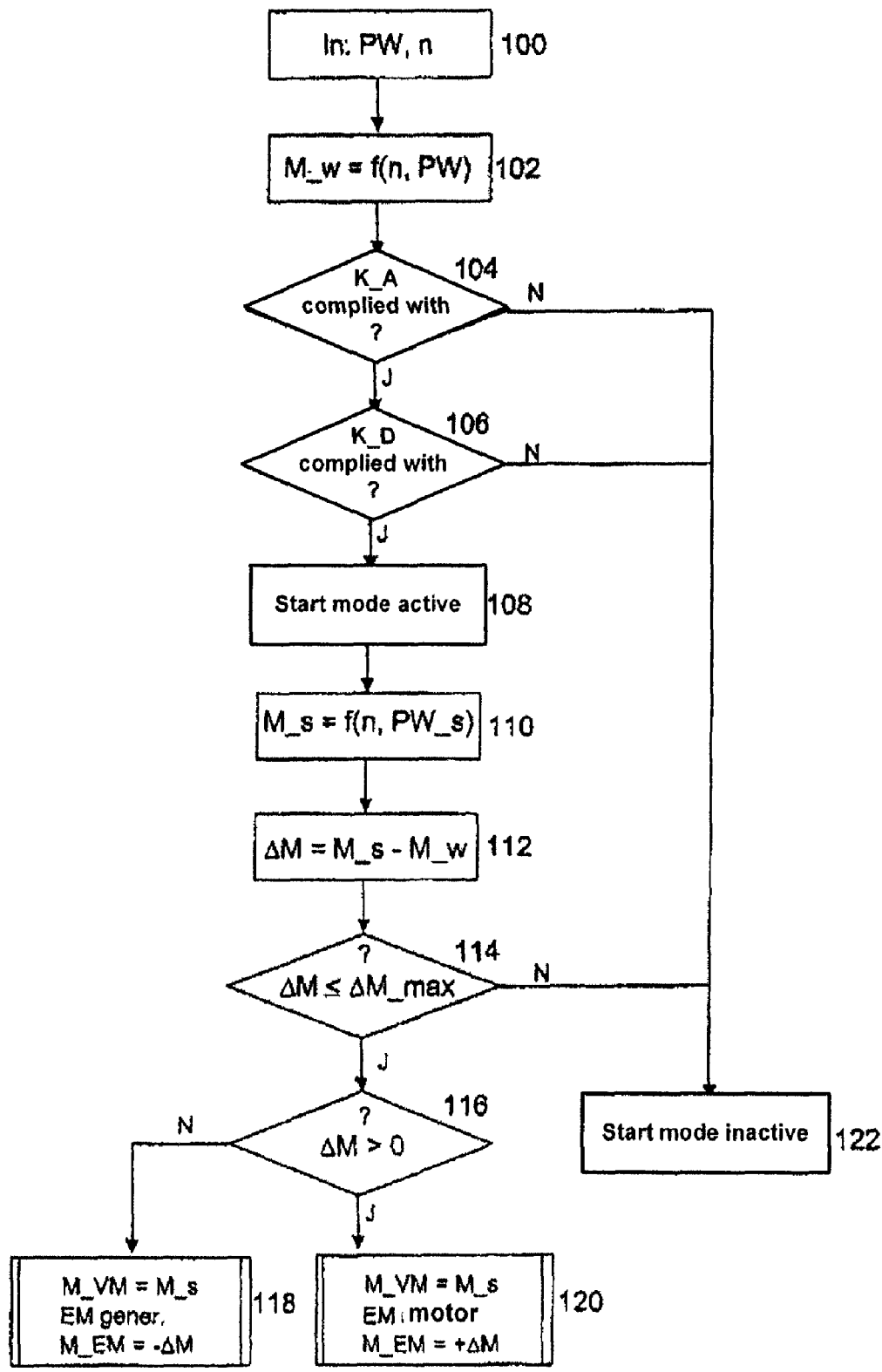

Exemplary embodiments of the invention will now be described with reference to the appended figures. It is shown in:

FIG. 1 schematically, the configuration of a hybrid drive unit according to the invention, and FIG. 2 a process flow of the method of the invention according to an embodiment of the invention.

FIG. 1 shows a parallel hybrid drive unit of a hybrid vehicle (not illustrated in detail) is indicated with the reference symbol 10. The vehicle is powered selectively or simultaneously by a first drive source, here a conventional internal combustion engine 12 (gasoline or diesel engine) as well and with an electric machine 14 (=electric motor, E-machine) which both operate on the same driveshaft, in particular on the crankshaft of the internal combustion engine 12. The electric machine 14 can be connected to the engine crankshaft in different ways. For example, the electric machine 14 can be connected with the crankshaft and directly or via a clutch, or via a belt drive, for example a toothed belt, or a tear or another non-positive and/or positive connection. A gear 16 connects the internal combustion engine 12 and the electric motor with an illustrated drive train 18. The drive shafts of the internal combustion engine 12 and the electric motor 14, respectively, can be disengaged from the gear 16 by a clutch 20, which can be operated by the driver by depressing a clutch pedal (not shown), wherein the clutch is engaged by releasing the clutch pedal. The gear 16 can alternatively be implemented as an automatic transmission or as a twin-clutch transmission, thereby obviating actuation of the clutch 20.

The electric machine 14, which is for example a three-phase asynchronous motor or synchronous motor, can be operated either in motor-mode with a positive electromotive torque M_EM or in generator-mode with a negative electromotive torque M_EM. In motor-mode, the electric machine 14 powers the drive train 18—alone or by supporting with the combustion-engine torque M_VM of the internal combustion engine 12—while consuming electric energy (current). The electric machine 14 receives the electric energy from an energy store 22, for example a battery and/or preferably a capacitor store. Conversely, in generator-mode, the electric motor 14 is driven by the internal combustion engine 12 or by the motion energy of the vehicle and converts the kinetic energy into electric energy and charges the energy store 22. Power electronics 24 switches the electric machine 14 between motor-mode and generator-mode and optionally also converts DC current and AC current, and vice versa.

According to the illustrated concept, the vehicle is primarily driven by the internal combustion engine 12 which is started by the electric motor 14 designed as started generator. The electric machine 14 is also switched in a during high load periods, in particular during acceleration of the vehicle, to provides a boost function in support of the vehicle drive (motor-mode). On the other hand, when the vehicle has excess kinetic energy in certain drive situations, the electric machine 14 performs a so-called recuperation function by converting in generator-mode the motion energy into kinetic energy for charging the energy store 22 and simultaneously providing a braking torque. A particularly suitable electric motor 14 for this application has a rated power of at most 50 kW, in particular of at most 30 kW, preferably in the range from 15 to 25 kW, most preferably of about 20 kW.

FIG. 1 also indicates an optional additional clutch 26 which may be arranged between the internal combustion engine 12 and the electric motor 14. By using this additional clutch 26, the internal combustion engine 12 can be decoupled separately from the drive train 18 and/or from the electric motor 14, which has the advantage that the mechanical friction resistance need not be carried along, when the internal combustion engine 12 is switched off. The additional clutch 26 also helps to reduce fuel consumption, while having higher associated costs, as well as increased manufacturing complexity and space requirements. The method described herein can be applied equally to hybrid drives with or without the additional clutch 26.

The operation of the internal combustion engine 12 and of the power electronics 24 is controlled by an engine controller 28, in which a torque control (indicated with the reference symbol 30) is integrated in form of a program algorithm. Alternatively, the torque control 30 can also be located in a separate control unit. A number of actual operating parameters of the vehicle are entered into the engine controller 28. In particular, a crankshaft rotation speed n and a pedal value PW of a pedal transducer—indicated by the reference symbol 32—are transmitted to the controller 28. The pedal value PW indicates the position of a gas pedal, i.e., the extent to which the driver depresses the gas pedal. The engine controller 28 also receives or determines information that characterizes a charge state (SOC, state-of-charge) as well as an aging state (SOH, state-of-health) of the energy store 22.

The controller 28 determines as a function of the pedal value PW and the rotation speed n from the stored curve fields an actual desired torque M_W and controls both the combustion-engine torque M_VM of the internal combustion engine 12 and the electromotive torque M_EM of the electric machine 14 accordingly. When the vehicle and the engine are started, in particular during a cold start, the method of the invention stored in the torque control 30 for controlling the drive torque of the hybrid drive unit 10 ("start mode") is applied—as long as specified criteria are met, as illustrated below in the flow diagram in FIG. 2.

The process starts at step 100 where the actual pedal value PW set by the driver and the actual rotation speed n of the driveshaft of the hybrid drive 10 are read. Thereafter, at step 102, a desired torque M_w corresponding to the request from the driver is determined. For this purpose, characteristic curves or curve fields stored in the engine controller 28 are used.

In the next step 104, a query is made if criteria K_A for determining the inactivity of an exhaust gas emission control system of the hybrid drive unit 10 (not shown in FIG. 1) are met. These criteria K_A include at least one of the following criteria which have already been described above:

the catalytic converter temperature falls below a predetermined limit temperature;
 the integrated heat supplied to the exhaust gas system falls below a predetermined limit value;
 the catalytic converter light-off not yet recognized;
 a predetermined time interval after ignition of the internal combustion engine 12 has not yet elapsed;
 a predetermined time interval after start of the internal combustion engine 12 has not yet elapsed;
 the operational readiness of exhaust gas sensors of the emission control system, in particular lambda sensors, has not yet been reached.

The criteria K_A are used individually or in combination for determining a state of the exhaust gas emission control system which is characterized by an activity which is either not (yet) present or which is limited, and ensure that the method of the invention is applied essentially only after a start of the internal combustion engine 12.

If the query in step 104 is answered in the affirmative, i.e., the exhaust gas emission control system is not active or does not have sufficient activity, then the process goes to step 106 where it is queried if criteria K_D for determining the feasibility of the torque control method of the invention are met. These criteria K_D include at least one of the following criteria, which have already been described above:

a rotation speed requested for the vehicle drive is within a predetermined range;
 the desired torque M_w requested for the vehicle drive is within a predetermined range;
 the charge state SOC of an energy store 22 exceeds a predetermined value;
 the adapted actual vehicle height above NN is less than a predetermined value.

The criteria K_D are used individually or in combination to ensure that the method of the invention can be performed in the actual drive situation or state and does not adversely affect on the operational safety and the driving comfort.

If the query 106 is likewise answered in the affirmative, i.e., if the method of the invention can actually be performed, then the start mode according to the invention is activated at step 108. In the start mode, at step 110, a nominal torque M_s is determined first as a function of the actual rotation speed n read in at step 100 and a "nominal load demand" PW_s and optionally also as a function of the elapsed time since the vehicle was started. The nominal load demand PW_s corresponds to a predetermined load demand which is identical for all start processes, for example corresponding approximately to a typical average curve or a standard test cycle. The nominal torque M_s as a function of the rotation speed n and the nominal load demand PW_s as well as the desired torque M_w determined at step 102 are derived from the stored characteristic curves or curve fields. Subsequently, at step 112, a torque difference ΔM between the previously determined nominal torque M_s and the actually desired torque M_w determined at step 102 is determined according to the equation ΔM=M_s−M_w.

The process then goes to step 114, where it is queried if the torque difference ΔM is smaller than or equal to a predetermined maximum torque difference ΔM_max. If the query is answered in the affirmative, then it is queried at step 116 if the torque difference ΔM determined at step 112 is greater than zero.

If the query at step 116 is answered in the negative, i.e., if the torque difference ΔM is negative and the requested desired torque M_w is greater than the nominal torque M_s, then the process goes to step 118. The internal combustion engine 12 is then controlled so that the generated combustion-engine torque M_VM corresponds to the nominal torque M_s. Because the internal combustion engine 12 now provides a greater drive torque than requested by the driver, the electric machine 14 is operated as a generator and is powered by the excess torque ΔM. The electric machine therefore generates electric energy which is used to charge the energy store 22. In generator-mode, the electric machine 14 produces a negative torque with the value −ΔM, which acts as a braking torque, so that at the end, the total drive torque corresponds to the desired torque M_w.

If the query 116 is answered in the affirmative, i.e., if the torque difference ΔM is positive and the requested desired torque M_w is smaller than the nominal torque M_s, then the process goes to step 120. The internal combustion engine 12 is then controlled so that its combustion-engine torque M_VM corresponds to the nominal torque M_s. Because the internal combustion engine 12 now provides a smaller drive torque than requested by the driver, the electric machine 14 operates as a motor and supplies a positive electromotive torque M_EM according to the torque difference ΔM. The result is again a total drive torque that corresponds to the desired torque M_w.

At step 118 as well as at step 120, the internal combustion engine 12 is not operating according to the desired torque M_w, but rather according to the nominal torque M_s. This has the advantage that all operating parameters of the internal combustion engine, in particular cylinder fill, fuel quantity, injection timing, injection angles (for gasoline engines), mixture conditioning (homogeneous charge or stratified charge), exhaust gas return rate, etc., can be optimized so that the exhaust gas emission control system can be quickly activated and raw emission of the internal combustion engine 12 can be kept to a minimum. Because the load curve after engine start is defined by M_s and therefore known in advance, the internal combustion engine 12 can be supplied with optimal data independent of individual driver behavior. This ensures reproducible start processes as well as reproducible exhaust gas tailpipe emissions.

If one of the queries 104, 106 or 114 is answered in the negative, i.e., if the exhaust gas emission control system is sufficiently active or if the method of the invention can not actually performed or the torque difference ΔM is too large, then the routine goes to step 122, where the start mode according to the invention is deactivated. The system is then operated conventionally, wherein the internal combustion engine 12 is typically operated according to the requested desired torque M_w.

LIST OF REFERENCE SYMBOLS

10 Hybrid drive unit
12 First drive source/internal combustion engine
14 Electric machine (electric motor)
16 Gear
18 Drive train
20 Clutch or twin-clutch unit
22 Energy store/battery
24 Power electronics
26 Additional clutch
28 Engine controller
30 Torque control
32 Pedal value transducer
n Rotation speed
PW Pedal value (load demand)
PW_s Nominal load demand
M_EM Electromotive torque
M_VM Combustion-engine torque
M_s Predetermined nominal torque
M_w Requested torque (desired torque)
ΔM Torque difference (ΔM=M_s−M_w)
SOC Charge state of the energy store

The invention claimed is:

1. A method for controlling a drive torque of a hybrid drive unit of an automobile after a start, the hybrid drive unit comprising a first drive source and at least one electric machine, wherein the first drive source is an internal combustion engine, wherein the at least one electric machine is configured to be selectively operated in a motor-mode or in a generator-mode, wherein the at least one electric machine provides an electromotive torque in the motor-mode, which in conjunction with a torque of the first drive source represents a total drive torque of the hybrid drive unit, and supplies electric power in the generator-mode, the method comprising the steps of:
    determining an actual requested desired torque as a function of at least an actual pedal value;
    determining a predetermined nominal torque of the first drive source as a function of an actual rotation speed of the first drive source and independently of the actual requested desired torque;
    operating, if predetermined criteria are met, the first drive source according to the predetermined nominal torque;
    determining a torque difference between the predetermined nominal torque and the actual requested desired torque; and
    operating, when the torque difference is negative, the at least one electric machine in the motor-mode so as to provide an electromotive torque corresponding substantially to the torque difference.

2. The method according to claim 1, wherein, for a positive torque difference, the at least one electric machine is operated in the generator-mode for supplying electric energy essentially corresponding to the positive torque difference.

3. The method according to claim 2, wherein the electric energy is used for charging an energy store and/or for supplying energy directly to an onboard vehicle electric system.

4. The method according to claim 1, wherein the predetermined nominal torque is predefined as a function of an actual rotation speed of the first drive source according to a standardized driving cycle.

5. The method according to claim 1, wherein the method is suspended when the absolute value of the determined torque difference exceeds a maximum pre-determined difference.

6. The method according to claim 1, wherein a tolerance range for the predetermined nominal torque is defined and the torque difference between the tolerance range of the predetermined nominal torque and the actual requested desired torque is determined.

7. The method according to claim 1, wherein the predetermined criteria comprise criteria for determining an inactivity of an exhaust gas emission control system.

8. The method according to claim 7, wherein the predetermined criteria for determining the inactivity of an exhaust gas emission control system comprise at least one of the following criteria:
- a catalytic converter temperature falls below a predetermined limit temperature;
- an integrated heat supplied to the exhaust gas system falls below a predetermined limit value;
- a catalytic converter light-off not yet recognized;
- a predetermined time interval after ignition of the first drive source has not yet elapsed;
- a predetermined time interval after start of the first drive source has not yet elapsed; and
- an operational readiness of exhaust gas sensors of the emission control system has not yet been reached.

9. The method according to claim 1, wherein the predetermined criteria comprise criteria for determining the feasibility of the torque control method.

10. The method according to claim 9, wherein the predetermined criteria for determining the feasibility of the torque control method comprise at least one of the following criteria:
- a rotation speed requested for the vehicle drive is within a predetermined range;
- a desired torque requested for the vehicle drive is within a predetermined range;
- a charge state of an energy store exceeds a predetermined value; and
- an adapted actual vehicle height above NN is less than a predetermined value.

11. A torque control unit for a hybrid drive unit of an automobile after a start, the hybrid drive unit comprising a first drive source and at least one electric machine, wherein the at least one electric machine is configured to be operated in a motor-mode or in a generator-mode, wherein the at least one electric machine provides, in the motor-mode, an electromotive torque, which in conjunction with a torque of the first drive source represents a total drive torque of the drive unit, and supplies, in the generator-mode, electric power, wherein the torque control unit comprises a program algorithm and engine controller for carrying out the method according to claim 1.

12. The method according to claim 4, wherein the standardized driving cycle is a standardized exhaust gas driving cycle.

13. The method according to claim 8, wherein the exhaust gas sensors are lambda sensors.

14. The method according to claim 1, wherein the actual pedal value is indicative of a position of a gas pedal.

15. The method according to claim 1, wherein the actual pedal value is settable by a driver of the automobile.

* * * * *